United States Patent [19]

Kitsu et al.

[11] 4,382,348
[45] May 10, 1983

[54] SOILLESS PLANT GROWING DEVICE

[75] Inventors: Seiki Kitsu; Masayasu Yanagisawa, both of Tokyo; Hitoshi Kobayashi, Yamanashi, all of Japan

[73] Assignee: The Greenterior Co., Ltd., Tokyo, Japan

[21] Appl. No.: 215,584

[22] Filed: Dec. 11, 1980

[30] Foreign Application Priority Data

| Mar. 25, 1980 [JP] | Japan | 55-36869 |
| Jun. 14, 1980 [JP] | Japan | 55-82417[U] |
| Aug. 18, 1980 [JP] | Japan | 55-116007[U] |
| Aug. 18, 1980 [JP] | Japan | 55-116008[U] |

[51] Int. Cl.$^3$ ............................................. A01G 31/02
[52] U.S. Cl. ............................................. 47/59; 47/39
[58] Field of Search ............................. 47/59, 62–65, 47/66, 1, 39

[56] References Cited

U.S. PATENT DOCUMENTS

| 2,175,113 | 10/1939 | Fischer | 47/59 |
| 3,456,385 | 7/1969 | Plath | 47/63 |
| 3,830,013 | 8/1974 | Lesley | 47/63 |
| 3,927,491 | 12/1975 | Farnsworth | 47/63 |
| 4,034,506 | 7/1977 | Kasahara et al. | 47/64 |
| 4,037,360 | 7/1977 | Farnsworth | 47/63 |

FOREIGN PATENT DOCUMENTS

| 241896 | 12/1964 | Austria | 47/63 |
| 1053508 | 1/1967 | United Kingdom | 47/1 |
| 1543961 | 4/1979 | United Kingdom | 47/59 |
| 2014836 | 9/1979 | United Kingdom | 47/59 |

Primary Examiner—Robert E. Bagwill
Attorney, Agent, or Firm—Sughrue, Mion, Zinn, Macpeak and Seas

[57] ABSTRACT

A reusable soilless plant growing device in which plants can be grown from seeds and in which, irrespective of any increase or decrease in the quantity of nutrient solution, the plants remain in contact with the solution. The peripheral portion of a porous plate is fixedly secured to a buoyant frame. The buoyancy of the porous plate and frame together are such that the porous plate is positioned at least in contact with the surface of the nutrient solution when the device is floated thereon. A hollow chamber in the frame may be filled with a highly buoyant material. The position of the porous plate relative to the surface of the nutrient solution is adjustable in several of the described embodiments.

12 Claims, 20 Drawing Figures

SOILLESS PLANT GROWING DEVICE

BACKGROUND OF THE INVENTION

The present invention relates to plant cultivating devices. More specifically, the invention relates to devices for growing plants from seeds in a nutrient solution. Such devices, hereinafter will be referred to as "soilless plant growing devices" when applicable.

Various techniques for growing farm products in an aqueous nutrient solution are well known in the art and a variety of soilless plant growing devices have been proposed. For instance, a device for hydroponically growing plants such as cabbage and lettuce has been disclosed in the specification of U.S. Pat. No. 4,037,460.

Figure 1A:
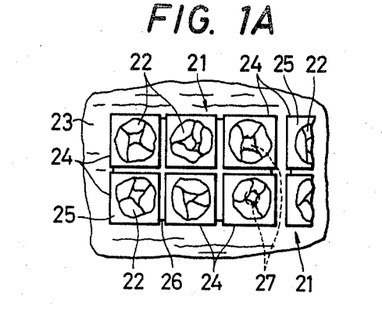
FIGS. 1A and 1B are a plane view and a sectional view showing a conventional soilless plant growing device.
Figure 1B:
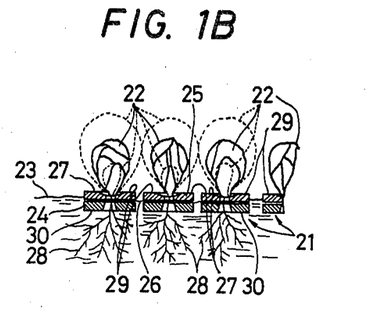

The conventional device is designed to stably float plants on the surface of water in the manner shown in FIGS. 1A and 1B. The conventional device has a plurality of rafts 21. The rafts 21 are formed of floating members 24 and 25 made of material of high buoyancy such as polystylene with foamed plastic or wood bonded to both surfaces of a breakable porous film 26 in such a manner that a pair of floating members 24 and 25 form one raft 21. Each pair of floating members 24 and 25 has one opening 27 at the center.

The above-described conventional device is used as follows. First, the film 26 is broken through the central openings 27 of the raft after which a seedling is planted in each central opening with the roots and the stem thereof grown respectively below and above the raft. The device is meritorious in that, as the film 26 is made of moisture absorbing material, plants can be grown directly from seeds.

However, the conventional device is disadvantageous in the following points. The device is so designed that only one seedling or seed can be placed on one raft. Therefore, depending on the kinds of plants to be cultivated, the device needs a considerably large cultivation area and it is difficult to grow plants high in density. Thus, the device is not economical. In growing plants from seeds, the seeds are placed on the film in the openings of the raft. Soon after sprouting, the roots break the film. Accordingly, it is impossible to re-use the device for growing plants from the seeds.

SUMMARY OF THE INVENTION

Accordingly, an object of the invention is to provide a soilless plant growing device in which all of the above-described difficulties accompanying a conventional soilless plant growing device are eliminated.

More specifically, an object of the invention is to provided a soilless plant growing device which can be used not only for growing farm products but also for house plants and as a teaching device for observing the processes of plant growth.

Another object of the invention is to provide a soilless plant growing device in which plants can be grown from the seeds and, irrespective of any increase or decrease in the quantity of nutrient solution.

A further object is to provide a device for growing plants which can be used repeatedly. As used herein, the term "nutrient solution" is intended to means any cultivating solution including plain water, water in which fertilizer or other nutrient material has been dissolved, or the like.

A further object of the invention is to provide a soilless plant growing device in which, depending on the conditions of growth of the plants used therewith, the porous plate thereof can be displaced with respect to the surface of the nutrient solution.

These, as well as other objects of the invention, are met by a soilless plant growing device including a porous plate and a buoyant frame adapted for fixedly securing the frame to a peripheral portion of the porous plate. The buoyancy of the porous plate and frame together are such that the porous plate is positioned at least in contact with the surface of a liquid, specifically a nutrient solution, when the plant growing device is floated on the liquid.

The frame of the plant growing device preferably includes ring-shaped upper and lower members which are joined together. Each of the ring-shaped upper and lower members is semi-circular in section. A hollow chamber is formed in the assembled frame. The bottom of the frame may be provided with at least three mounting holes at predetermined positions and legs provided on the frame the number of which is equal to the number of mounting holes. The legs are detachably mountable in corresponding ones of the mounting holes. The frame may be fused to the porous plate to form thereby an integral unit. Moreover, the porous plate may be sandwiched between a protrusion and a groove which are formed respectively on the inner circumferential edges of the upper and lower members forming the frame. Yet further, poles may be added extending upwardly from the frame with a ring-shaped rail provided at the top of the poles. This prevents plants from falling over once they have reached a certain height.

The upper and lower members may be provided with a boss and a recess formed on the outer circumferential edges thereof, respectively. Vertical portions are then provided protruding from the inner surfaces of the upper and lower members so that the vertical portions form a partition wall in the frame when the upper and lower members are assembled to form the frame. Highly buoyant filling material may be disposed in the hollow chamber of the frame. The lower member of the frame may be provided with a stepped portion the diameter of which is larger than the inside diameter of the body of the frame. In this case, an elastic fixing member is provided with the peripheral portion of the porous plate being retained by depressing the elastic fixing member into the stepped portion. The elastic fixing member has an outside diameter substantially equal to the inside diameter of the stepped portion for this purpose.

In one preferred embodiment, the frame has the form of a ring having a circular through-hole formed therein, which is relatively large in diameter, at the center thereof. The porous plate has a circular edge in that case with the circular frame being detachably insertable into the circular through-hole of the frame so that the porous plate is adjustable in level with respect to the frame.

A plurality of groups of engaging recesses of different depths may be formed in the inner circumferential edge of the frame in which case the porous plate is provided with a plurality of engaging pieces extending from the circular edge thereof which are selectively engageable with the plurality of groups of the engaging recesses so that the porous plate can be adjusted in position with respect to the surface of the liquid floating the device. The porous plate may have a circular through-hole at the center thereof so that the porous plate is adapted for receiving a bulb. The porous plate may be made integral with a supporting plate made of hard synthetic resin and the frame provided along the periphery of the supporting plate.

DESCRIPTION OF THE PREFERRED EMBODIMENTS

Figure 2:
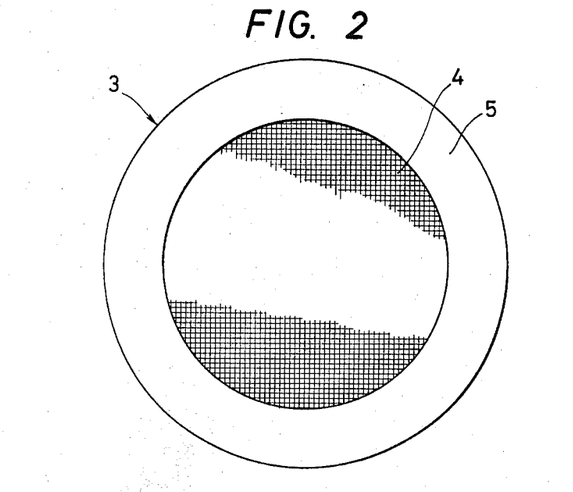
FIG. 2 is a plane view showing a first preferred embodiment of a soilless plant growing device according to the invention.
Figure 3:
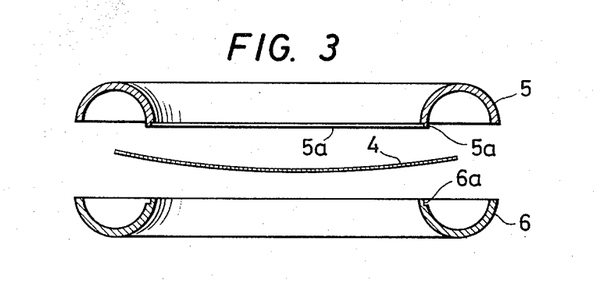
FIG. 3 is a sectional view of the device shown in FIG. 2.

A first embodiment of a soilless plant growing device according to the invention, as shown in FIGS. 2 and 3 includes a porous plate 4 such as a fine-mesh net, an upper member 5, and a lower member 6. The porous plate 4 is in the form of a net made of plastic or metal, preferably a corrosion-resistant material. Each of the upper and lower members 5 and 6 is semi-circular in section and is made of synthetic resin for instance. The porous plate 4 is sandwiched between the upper and lower members 5 and 6 in such a manner that a hollow chamber is formed by the members 5 and 6. Preferably, each of the members 5 and 6 is in the form of an annular ring as shown in FIGS. 2 and 3. However, each may be in the form of a polygonal ring. The inner circumferential edge of the lower member 6 is formed into an engaging protrusion 5a while the inner circumferential edge of the upper member 5 is formed into an engaging groove 6a, as shown in FIG. 3, so that the engaging protrusion 5a is engaged with the engaging groove 6a with the porous plate 4 interposed therebetween. When the protrusion 5a is engaged with the engaging groove 6a with the porous plate 4 disposed therebetween, the upper and lower members 5 and 6 form a frame. This frame is subjected to thermal fusion to form an integral unit. That is, the upper and lower members 5 and 6 and the porous plate 4 are provided as a single unit forming the soilless plant growing device 3. In assembling the device, the porous plate 4 can first be joined to either one of the upper and lower members 5 and 6 then the other one of the upper and lower members 5 and 6 joined to the previously-assembled porous plate and other member to form a single unit.

In the device 3, the upper member 5 and the lower member 6 are joined together to form the above-described hollow chamber and are sealed so that the device 3 can float on the surface of the nutrient solution.

Figure 4:
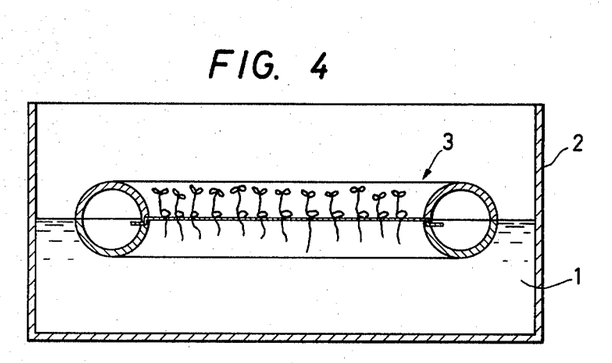
FIG. 4 is a sectional view illustrating a method of using the device in FIGS. 2 and 3.

The device 3 can be used as illustrated in FIG. 4 for instance. A nutrient solution 1, which is preferably a plant growing aqueous solution obtained by mixing chemical fertilizer with water, is put in a container 2 and then the device 3 is floated on the surface of the solution 1. As described herein, the device 3 is used with the contianer 2. However, it should be noted that the invention is not limited thereto or thereby. That is, the device can also be used in a pond, river, or other suitable nutrient solution source.

The device of the invention is so designed that when the device floats on the surface of water, the net-shaped porous plate is substantially in contact with the water surface. This is essential for germination of seeds.

As is apparent from the above description, when seeds are placed on the porous plate 4 with the soilless plant growing deivce 3 floating on the surface on the solution 1, the seeds cannot sink into the solution but remain bathed by the solution. Accordingly, the seeds can grow satisfactorily absorbing solution as needed.

Even if the quantity of solution in the container is decreased by evaporation of water or is increased by supplying water, the device 3 will continue to float on the surface of the solution and accordingly the seeds are satisfactorily maintained in contact with the solution. That is, the seeds are in contact with the solution and air at all times and therefore the seeds can absorb both solution and air stably.

The device 3 is applicable not only to seeds but also plants which have rooted or spread branches. That is, such plants can be cultivated merely by placing them on the porous plate 4. If the device is used for cultivating plants which spread long roots, sometimes the roots spread to the extent that they cover the bottom of the container. If, in this case, the level of water in the device 3 changes, then the plants may be harmed.

Figure 7:
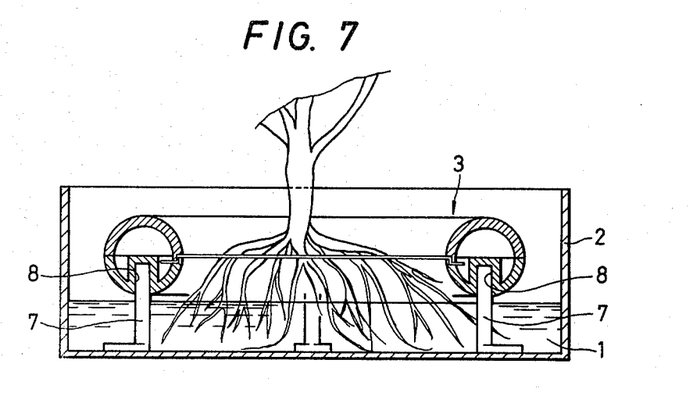
FIG. 7 is a sectional view showing a fourth preferred embodiment of a device according to the invention and illustrating a method of using this device.
Figure 8:
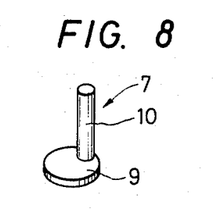
FIG. 8 is a perspective view showing a leg employed in the device in FIG. 7.

This difficulty can be eliminated by employing legs 7 as shown in FIG. 7, that is, by supporting the soilless plant growing device 3 with the legs 7. In order to readily connect the legs 7 to the device 3, mounting holes 8 are provided in suitable portions of the lower member 6. Each leg 7, as shown in FIG. 8, includes a seat plate 9 which is placed on the bottom of the container 2 and a post 10. The posts 10 of the legs 7 are inserted into the mounting holes to support the device 3.

In the embodiment shown in FIG. 7, the device 3 is supported by the legs 7 at three points corresponding to the mounting holes. However, the invention is not limited thereto or thereby. That is, the number of supporting points of the device 3 is optional and can, for instance, be four or six.

Figure 18:
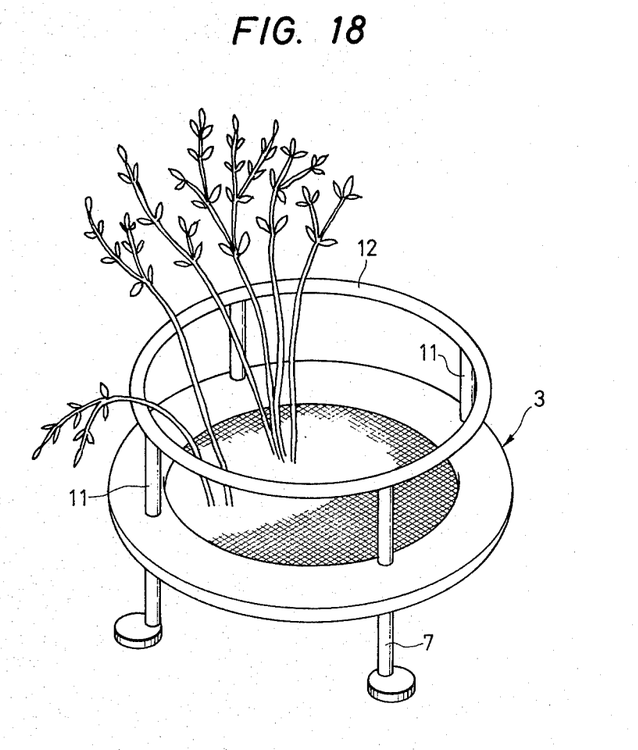
FIG. 18 is a perspective view showing a soilless plant growing device of the invention in which upwardly-extending poles and a ring-shaped rail have been added.

The device of FIG. 7 can further be modified by the addition of upwardly-extending poles 11 and a ring-shaped guard rail 12. The guard rail 12 prevents the plants from falling over once they reach a certain height. This is shown in FIG. 18.

Figure 5:
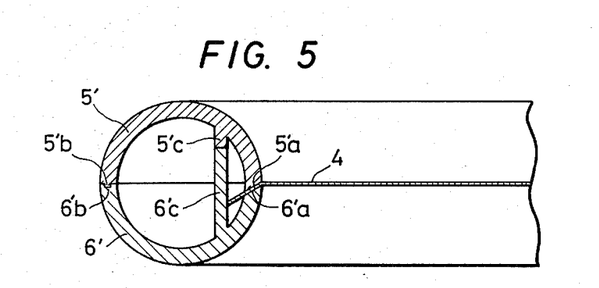
FIG. 5 is a sectional view of a part of a second preferred embodiment of a device of the invention.

The frames 5 and 6 may be formed not only as shown in FIG. 3 but also as shown in FIG. 5. In the frame shown in FIG. 5, the portions of the upper and lower members 5' and 6' which clamp the peripheral portion of the porous plate 4 are formed as surfaces 5'a and 6'a which are inclined with respect to the central sectional plane of the frames 5 and 6 so that the peripheral portion of the porous plate 4 is clamped by the surfaces 5'a and 6'a in such a manner that it is bent. An elongated boss or protrusion 5'b is formed on the outer circumferential edge of the upper member 5 while an elongated recess 6'b is formed in the outer circumferential edge of the lower member 6 so that the protrusion 5'b engages with the recess 6'b. Accordingly, after the frame has been assembled by engaging the protrusion and the recess, no solution can enter the chamber formed between the upper and lower members 5' and 6'. The upper and lower members 5' and 6' have partition walls 5'c and 6'c in such a manner that the ends of the partition walls 5'c and 6'c are abutted against each other when the upper and lower members 5' and 6' are assembled. The outer circumferential edges of the upper and lower members 5' and 6', namely first separating surfaces of the upper and lower members 5' and 6', the abutting ends of the partition walls 5'c and 6'c, namely second separating surfaces of the upper and lower members 5' and 6', and the porous plate clamping surfaces formed on the inner circumferential edges of the upper and lower members 5' and 6', specifically third separating surfaces, are staggered from one another so as to not be on the same level. Accordingly, when the upper and lower members 5' and 6' are coupled to each other, the separating surfaces are suitable joined and two chambers are formed in the frame. It is evident that, with this structure, no solution can enter the two chambers.

Figure 6:
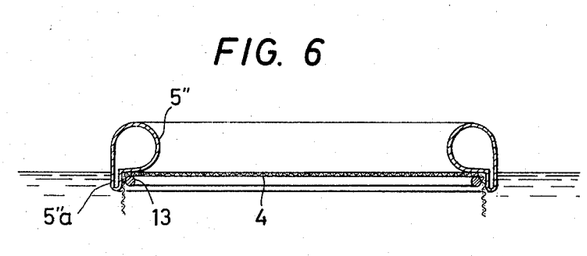
FIG. 6 is a sectional view showing a third preferred embodiment of a device according to the invention.

Another embodiment of a device according to the invention is shown in FIG. 6. In this embodiment, the device includes a hollow frame body 5" having a stepped protrusion 5"a at the bottom with the diameter of the stepped protrusion 5"a being larger than the inside diameter of the frame body 5" and a ring member 13 the outside diameter of which is substantially equal to the inside diameter of the stepped protrusion 5"a. In that device, the peripheral portion of the porous plate 4 is clamped by the stepped protrusion 5"a and the ring member 13. That is, it is held in place by pushing the ring member 13 into the stepped protrusion 5|a of the frame body 5".

Figure 9:
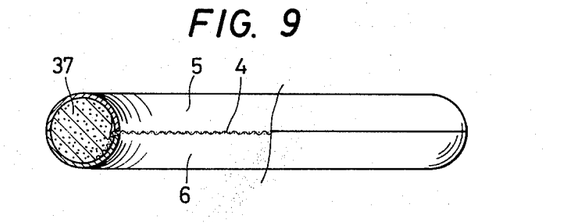
FIG. 9 is a sectional view of a part of a first modification of the devices shown in FIGS. 2 through 4.

Another embodiment of a soilless plant growing device of the invention is shown in FIG. 9. As is apparent from a comparison of FIG. 9 and FIGS. 2 and 3, the device in FIG. 9 is similar to that in FIGS. 2 and 3 but the former is different from the latter in that, when the upper and lower members 5 and 6 are assembled, a filling material 37 having a high buoyancy such as foamed urethane or foamed styrol is disposed in the chamber which is formed by the upper and lower members 5 and 6.

In the soilless plant growing device of FIG. 9, buoyancy is provided by the filling material in the chamber formed by the upper and lower members 5 and 6. With this structure, it is not always necessary to completely seal the chamber in the frames 5 and 6 and hence the accuracy used in manufacturing the device can be relatively low. Thus, the device shown in FIG. 9 can be readily and inexpensively manufactured.

Figure 10:
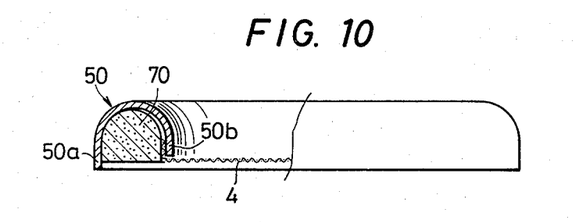
FIG. 10 is a sectional view of a part of a second modification of the devices shown in FIGS. 2 through 4.

FIG. 10 shows a modification of the soilless plant growing device of FIG. 9. In this modification, a frame 50 is provided in the form of a deep groove having outer and inner side walls 50a and 50b. The peripheral portion of a porous plate 4 is folded over the inner surface of the inner side walls 50b. An elastic retaining ring 70 made of foamed resin is pushed into the groove-shaped frame 50 to retain the porous plate 4. The peripheral portion of the porous plate 4 is fixedly secured between the ring 70 and the inner side wall 50b. Thus, in the device shown in FIG. 9, it is unnecessary to provide the above-described lower member 6.

In the embodiments of the device shown in FIGS. 9 and 10, filling material made of high buoyancy material such as foamed resin is disposed inside the frame. Therefore, even if liquid enters the frame when the device floats on the surface of a plant growing nutrient solution, the buoyance of the device is maintained substantially unchanged. In addition, it is unnecessary to completely seal the frame. Accordingly, the devices shown in FIGS. 9 and 10 can be readily and inexpensively manufactured.

Figures 11, 12:
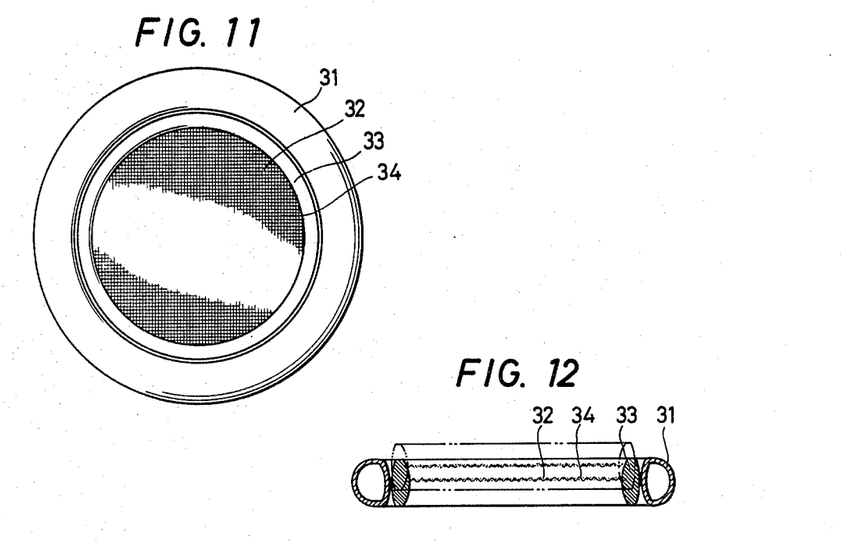
FIG. 11 is a plane view showing a fifth preferred embodiment of a device according to the invention.
FIG. 12 is a sectional view of the device in FIG. 11.

FIGS. 11 through 14 show further embodiments of a device according to the invention. In FIGS. 11 and 12, reference numeral 31 designates a hollow buoy which is constructed by thermally fusing the edges of upper and lower annular rings in such a manner that a circular space of relatively large diameter is formed at the center and reference numeral 32 designates a net member which is inserted into the circular space. The net member 32 is composed of a circumferential frame 33 made of hard synthetic resin and a porous plate 34 made of a fine mesh. The porous plate 34 is preferably made of synthetic resin and is bonded to the circumferential frame 33. The outer wall of the circumferential frame 33 is made round so that it can be readily inserted into the circular space of the buoy 31. More specifically, the net member 32 is normally disposed as indicated by the solid lines in FIG. 12 although when necessary it can be pushed upwardly to a desired level as indicated by the chain lines in FIG. 12. Seeds are placed on the net plate 34 after the device has been floated on the surface of the nutrient solution with the net member 32 set as indicated by the solid lines in FIG. 12. After the roots have spread in the solution the net member 32 can be raised to a desired level so that parts of the roots are above the surface of water.

Figure 13:
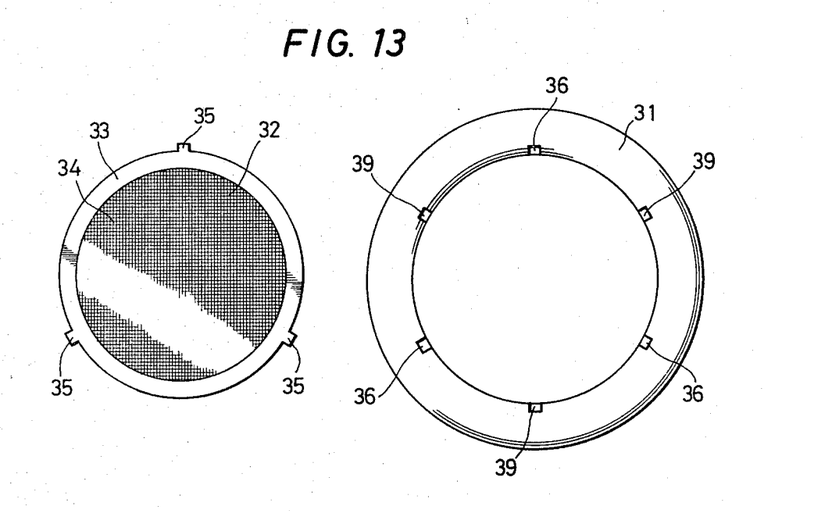
FIG. 13 is a plane view showing a first modification of the device in FIGS. 11 and 12.

FIG. 13 shows a modification of the device shown in FIG. 12. Three engaging members 35 extend from the circumferential frame 33 of the net member 32 while engaging recesses 36, 39 are formed in the inner edge of the buoy 31 at equal intervals so that the members 35 can engage with the engaging recesses. More specifically, a plurality of groups of engaging recesses are formed in the inner edge of the buoy 31 with different ones of the groups of engaging recesses having a different depth. In the device shown in FIG. 13, a first group of engaging recesses 36 and a second group of engaging recesses 39 are formed in the buoy 31 in such a manner that the first group has a different depth than the second group. Accordingly, the height of the net member 32 with respect to the buoy 31 can be changed by changing the engagement of the engaging pieces 35 with the engaging recesses.

Figure 14:
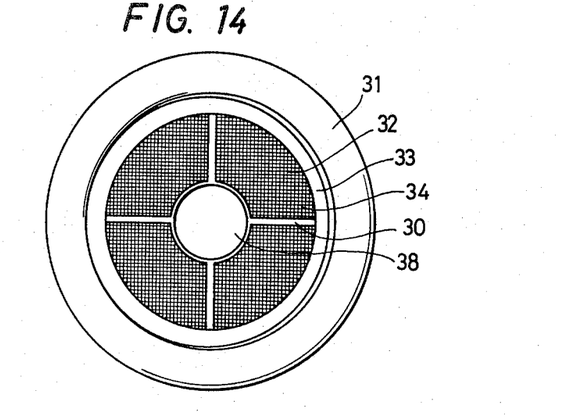
FIG. 14 is a plan view showing a second modification of the device in FIGS. 11 and 12.

FIG. 14 shows another modification of the device of FIGS. 11 and 12. In this modification, the net member 32 is provided with a circular hole 38 at the center thereof. The circular hole 38 is used to support a bulb. That is, the device in FIG. 14 is so designed that the net member 32 can receive a bulb as well as seeds. In FIG. 14, reference numeral 30 designates reinforcing ribs. The other components of the device of FIG. 14 are similar to those of the device in FIGS. 11 and 12.

As is clear from the above description, in the devices shown in FIGS. 11 through 14, the net member 32 can be raised to a suitable level, depending on the root spreading conditions, so as to increase the speed of growth of plants being cultivated. The suitable level may be such as to provide an air space or gap between the net member 32 and the surface of the nutrient solution. Since the buoy 31 is provided separately from the net member 32, the device can be readily manufactured.

Figure 15:
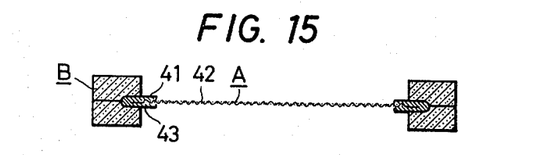
FIG. 15 is a sectional view of a sixth preferred embodiment of a device according to the invention.
Figure 16:
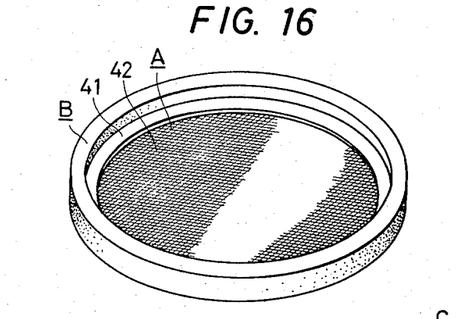
FIG. 16 is a perspective view of the device shown in FIG. 15.

Shown in FIGS. 15 and 16 is another preferred embodiment of a device according to the invention. The device shown therein includes a net member A and a floating member or buoy B. The net member A is made up of a frame 41 made of hard synthetic resin and a fine mesh net plate 42 the peripheral portion of which is fixedly inserted into the frame 41. The buoy B is used to provide floatation for the net member A. The buoy B, which is made of foamed resin such as polyethylene, surrounds the frame 41. In the device, as shown in FIG. 16, the foamed resin surrounds the entire circumference of the frame 41. This may be achieved by employing a pair of annular pieces which conform to the outside diameter of the frame 41 with the pair of annular pieces bonded together with the frame 41 interposed therebetween.

Figure 17:
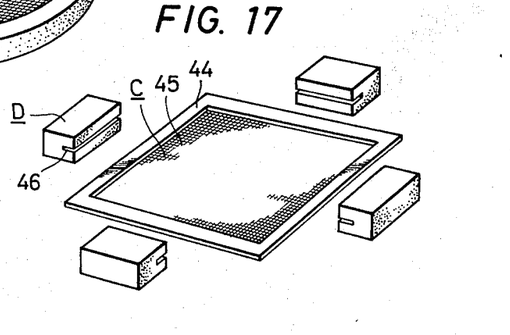
FIG. 17 is a perspective view showing a modification of the device shown in FIGS. 15 and 16.

A yet further preferred embodiment of a device according to the invention is shown in FIG. 17. In this embodiment, the net member C is rectangular. The net member C includes a net plate 45 the peripheral portion of which is held by a frame 44. The device further includes blocks D which act as buoys for floatingly supporting the net member C on the surface of the nutrient solution. Similar to the embodiments shown in FIGS. 15 and 16, the buoys D are made of foamed resin such as polystyrene. Each of the buoys D has, for instance, the form of a parallelepiped and has a slot 46 on one side into which the sides of the rectangular net member C are fixedly inserted.

In this embodiment, the frame 44 of the net member C is made of hard synthetic resin and the buoy D is made of foamed resin. Moreover, it should be noted that the invention is not limited thereto or thereby. That is, the frame and net member may be made of any material which can achieve the objects of the invention.

In the use of the device shown in FIG. 17, a suitable number of blocks D and the net member C are assembled together by inserting the sides of the net member C into the slots 46 of the buoys D. After the assembly and after the assembled device has been floated horizontally on the surface of the nutrient solution, seeds are placed on the net plate 45 for germination. In the device, the buoys D are provided separately from the net member C. Accordingly, depending on the variations in weight of the device or variations in the center of gravity of the device due to the growth of the plants, the number of blocks mounted on the frame 44 of the net member C can be increased or decreased so that the net member C is maintained in an optimum state on the surface of the nutrient solution at all times.

As is clear from the above description, the soilless plant growing device according to the invention can be used to grow a variety of plants ranging from flowers whose lives are relatively short to perennial plants which live all the year round. It is possible to transplant to soil plants which have been grown with the soilless plant growing device. The soilless plant growing device according to the invention is simple in construction and low in manufacturing cost. Moreover, it is well-adapted for use as a teaching device to allow children to observe the process of growth of plants from seed germination. Another merit of the device is that it can be re-used.

What is claimed is:

1. A soilless plant growing device comprising:
   a porous fine mesh plate; and
   a buoyant frame, said plate being supported only at a peripheral portion thereof by said frame, the buoyancy of said porous plate and frame being such that said porous plate is positioned at least in contact with a surface of a liquid when said device is floated on said liquid, substantially all of said plate being unconfined, open, and suitable for growing plants.

2. The device as claimed in claim 1 in which said frame comprises joined ring-shaped upper and lower members each of which is semi-circular in section with a hollow chamber being formed in said frame.

3. A soilless plant growing device comprising:
   a porous plate;
   a buoyant frame adapted for fixedly securing said frame to a peripheral portion of said porous plate, the buoyancy of said porous plate and frame being such that said porous plate is positioned at least in contact with a surface of a liquid when said device is floated on said liquid;
   said frame comprising joined ring-shaped upper and lower members each of which is semi-circular in section with a hollow chamber being formed in said frame;
   a bottom of said frame being provided with at least three mounting holes at predetermined positions and said frame further comprising legs the number of which is equal to the number of said mounting holes, said legs being detachably mountable in corresponding ones of said mounting holes.

4. The device as claimed in claim 2 in which said frame is fused to said porous plate to form an integral unit.

5. The device as claimed in claim 2 in which said porous plate is sandwiched between a protrusion and a groove which are formed respectively on the inner circumferential edges of said upper and lower members forming said frame, said porous plate being fused to said frame.

6. A soilless plant growing device comprising:
   a porous plate;
   a buoyant frame adapted for fixedly securing said frame to a peripheral portion of said porous plate, the buoyancy of said porous plate and frame being such that said porous plate is positioned at least in contact with a surface of a liquid when said device is floated on said liquid;
   said frame comprising joined ring-shaped upper and lower members each of which is semi-circular in section with a hollow chamber being formed in said frame;
   said porous plate being sandwiched between a protrusion and a groove which are formed respectively on inner circumferential edges of said upper and lower members forming said frame, said porous plate being fused to said frame;

said upper member and said lower member having a boss and a recess formed on outer circumferential edges thereof, respectively, and having vertical portions protruding from inner surfaces of said upper and lower members, respectively, so that said vertical portions form a partition wall in said frame when said upper and lower members are assembled to form said frame.

7. The device as claimed in claim 2 further comprising highly buoyant filling material disposed in said hollow chamber of said frame.

8. A soilless plant growing device comprising:
a porous plate;
a buoyant frame adapted for fixedly securing said frame to a peripheral portion of said porous plate, the buoyancy of said porous plate and frame being such that said porous plate is positioned at least in contact with a surface of a liquid when said device is floated on said liquid;
said frame including a frame body having a stepped protrusion an inside diameter of which is larger than an inside diameter of said frame body; and
further comprising an elastic fixing member, a peripheral portion of said porous plate being retained by depressing said elastic fixing member into said stepped protrusion, said elastic fixing member having an outside diameter substantially equal to the inside diameter of said stepped protrusion.

9. A soilless plant growing device comprising:
a porous plate;
a buoyant frame adapted for fixedly securing said frame to a peripheral portion of said porous plate, the buoyancy of said porous plate and frame being such that said porous plate is positioned at least in contact with a surface of a liquid when said device is floated on said liquid;
said frame being in the form of a ring having a circular through-hole relatively large in diameter at a center thereof, and said porous plate having a circular edge adapted to be detachably insertable into said circular through-hole of said frame, said frame having means for supporting said porous plate at a plurality of levels with respect to said frame.

10. The device as claimed in claim 9 in which a plurality of groups of engaging recesses of different depth are formed in the inner circumferential edge of said frame, and said porous plate has a plurality of engaging pieces extending from said circular edge thereof which are selectively engagable with said plurality of groups of engaging recesses.

11. The device as claimed in claim 9 in which said porous plate has a circular through-hole at the center thereof adapted for receiving a bulb.

12. The device as claimed in claim 1 in which said porous plate including a supporting plate made of hard synthetic resin, and said frame is provided along the periphery of said supporting plate.

* * * * *